United States Patent [19]
Villarreal

[11] 4,089,117
[45] May 16, 1978

[54] SUNSHADE FOR TELESCOPIC SIGHTS

[76] Inventor: Rudy G. Villarreal, 10815 Pinehill St., San Antonio, Tex. 78230

[21] Appl. No.: 721,049

[22] Filed: Sep. 7, 1976

[51] Int. Cl.² ................... F41G 1/00; G03B 11/04
[52] U.S. Cl. ................................. 33/244; 350/58
[58] Field of Search .............. 350/58, 60; 33/244, 33/242

[56] References Cited
U.S. PATENT DOCUMENTS

| 698,999 | 4/1902 | Nicholson | 350/60 |
| 3,840,995 | 10/1974 | Freiling | 33/242 |

FOREIGN PATENT DOCUMENTS 212,098  3/1924  United Kingdom ................ 350/58

Primary Examiner—Steven L. Stephan
Attorney, Agent, or Firm—Willard J. Hodges, Jr.

[57] ABSTRACT

A sunshade particularly adapted for securing to a telescopic sight mounted on a rifle. The device is constructed preferably of flexible plastic possessing sufficient resiliency to return to its normal configuration after being flexed. A sunshade having a scope grasping collar at one end projecting forward to an arcuate forward edge and elongated side and the short side resulting in an elongated viewing slot in one side of the sunshade body.

3 Claims, 7 Drawing Figures

SUNSHADE FOR TELESCOPIC SIGHTS

BACKGROUND OF THE INVENTION

1. Field of the Invention

The invention pertains to an improved sunshade for rifle scopes. The shade is principally designed to permit sighting into the sun avoiding an obstruction of the view by glare and reflected light in the lens system.

2. Description of Prior Art

Sunshades on camera lenses and telescopic sights are old. Many telescopes and sunshade combinations have been patented. Examples are: U.S. Pat. No. 3,597,040 to Gotoh; U.S. Pat. No. 3,315,362 to Palmer; and U.S. Pat. No. 2,968,099 to Peters. The sunshades of the prior art generally project forward of the objective lens uniformly encircling and shading the lens on all sides.

SUMMARY OF THE INVENTION

The sunshade of this invention is primarily intended as an adjunct or attachment for a rifle scope. The shade comprises a flexible expansible scope grasping collar with an elongated body projecting forward to a leading arc at the forward end. An elongated relieved portion projects on one side of the sunshade and comprises a viewing slot. The construction permits the attaching of the sunshade to a telescopic sight and rotation of the sunshade into the sun blanking or shielding of the direct rays of the sun while leaving an adequate viewing remains visible for satisfactory alignment of the rifle scope. The flexible collar permits use on scopes of various sizes and shapes. Quick attachment and removal is facilitated by the flexible scope grasping collar.

For a detailed description of the construction and utilization of the preferred embodiment, reference is made to the attached several views wherein identical reference characters are utilized to refer to similar or equivalent components throughout the various figures and the following detailed description.

DESCRIPTION OF THE PREFERRED EMBODIMENT

Figure 2:
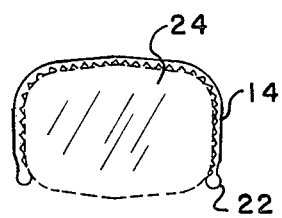
FIG. 2 is a fragmented view illustrating the scope grasping collar mounted on a rectangular objective lens.
Figure 4:
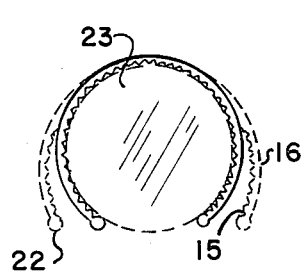
FIG. 4 is a fragmented view of the scope grasping collar utilized in combination with a circular objective lens.

The prototype of the preferred embodiment was constructed of a section of plastic pipe cut and filed to the desired configuration. The preferred method of construction would be the molding of plastic in the desired configuration. A wide variety of flexible plastics might be used such as polyvinyl chloride, natural or butyl rubber might be employed as well as polyethylene plastics. Any material having resilient properties permitting flexing within reasonable limits returning to its natural configuration after releasing of tension would function satisfactorily. The configuration of the preferred embodiment is as substantially illustrated in the attached drawings. The sunshade 10 is adapted to be mounted on a telescopic sight 11 secured to a rifle 12. For the construction of the device, reference is particularly made to FIGS. 4 and 5. The sunshade 10 is constructed of a configuration having an elongated body 13 with a scope grasping collar 14 at the first end 17 of the device. The scope grasping collar 14 is constructed with a serrated inner surface 15 as best illustrated in FIGS. 2 and 4. To further assist flexibility of the scope grasping collar 14, flexing slots 16 may be constructed in the outer surface of the collar 14 as illustrated in FIGS. 4 and 5.

Figure 5:
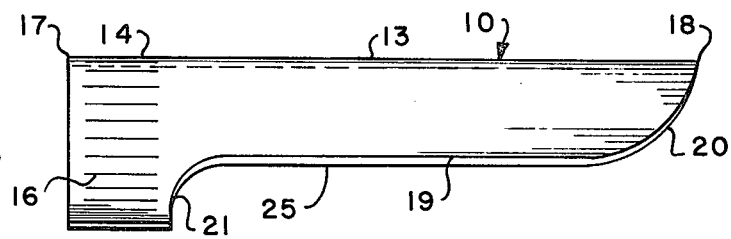
FIG. 5 is a side elevation view of the sunshade of this invention.
Figure 6:
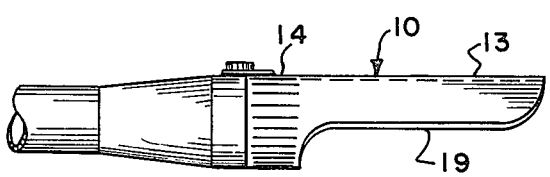
FIG. 6 is a fragmented view of the device of this invention secured to a telescopic sight.
Figure 7:
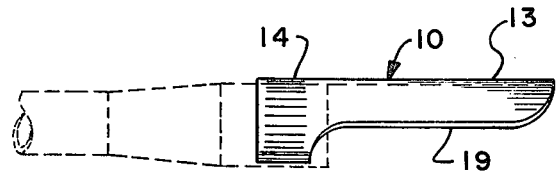
FIG. 7 is a fragmented side elevation view of the device of this invention mounted on a telescopic sight retained by the flexibility of the scope grasping collar.

The preferred configuration is as depicted in FIG. 5. The sunshade 10 has an elongated body 13 projecting from a first end 17 adjacent the scope grasping collar 14 to a second end 18 adjacent the leading arc 20. A relieved portion projects upward and foward from the scope grasping collar 14 forming a collar arc 21. The relieved portion between the collar arc 21 and the leading arc 20 forms the viewing slot 19. The bottom edge of the scope grasping collar 14 may be constructed with a thickened portion characterized as a flexing bead 22 illustrated in FIGS. 2 and 4. The flexibility of the plastic used in the construction in combination with the configuration of the device permits use on a rectangular objective lens 22 of FIG. 2 as well as on a round objective lens 23 as illustrated in FIG. 4. The elongated, relieved portion on one side of the sunshade 10 results in an interconnecting edge 25 projecting from the leading arc 20 to the collar arc 21. The relieved portion forms a wide viewing slot 19 permitting access of light and a wide field of view on one side of the sunshade 10.

OPERATION OF THE DEVICE

Figure 1:
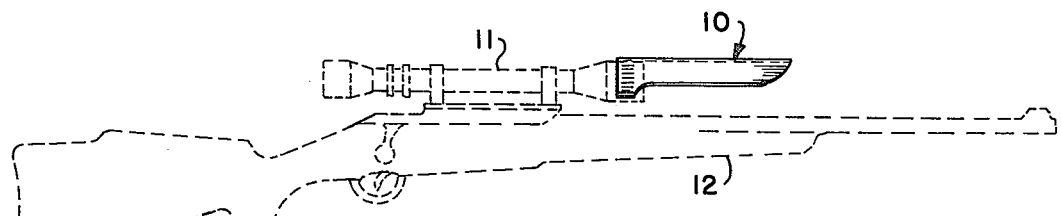
FIG. 1 is an elevation view of the sunshade mounted on a rifle having a telescopic sight.
Figure 3:
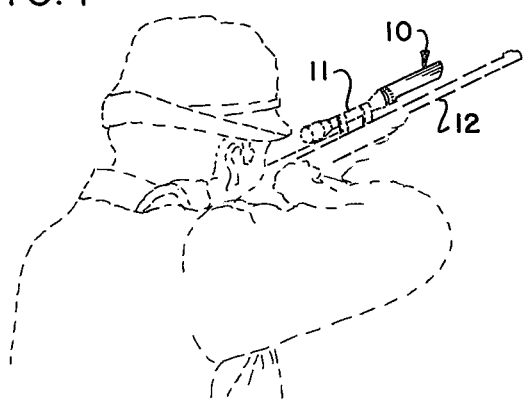
FIG. 3 is a perspective view simulating the use by a hunter of the device mounted on a rifle with scope.

The inventor was an experienced deer hunter to which an early morning shot into the sun prompted the invention. The sighting almost directly into the suns results in glare disrupting the field of view. The sunshade 10 of this invention can be secured to the telescopic sight 11 on a rifle 12 and rotated in a fashion to shield or screen the direct rays of the sun from the objective lenses 23 or 24 of the scope 11. The manner of use is best illustrated in FIGS. 1 and 3.

Having described and illustrated my invention in various configurations what is desired to be claimed is all embodiments not departing from the scope of equivalents of the invention as defined in the appended claims.

1. A sunshade for a telescopic sight comprising:
  a. an elongated flexible resilient plastic body having a first end and a second end having,
  b. a scope grasping collar having an inner surface and an outer surface secured to said first end, said scope grasping collar possessing sufficient flexibility and resiliency to be retained on a telescopic sight during the firing and recoil of a rifle, said scope grasping collar further comprising:
    (1) a serrated inner surface constructed in the inner surface of said scope grasping collar,
    (2) flexing slots constructed in said outer surface of said scope grasping collar, and (3) a flexing bead constructed at the bottom edge of said scope grasping collar to facilitate mounting and demounting on a telescopic sight,
c. said elongated flexible resilient plastic body projecting to the said second end,
d. a wide, elongated viewing slot constructed in said elongated flexible resilient plastic body extending from said second end to the area adjacent said scope grasping collar.

2. The invention of claim 1 wherein the device is secured to a telescopic sight.
3. The invention of claim 1 wherein the wide, elongated viewing slot is bordered on the said first end by,
a. a collar arc,
b. an interconnecting edge in the said elongated body projecting forward to,
c. a leading arc, the said configuration resulting in a wide relieved portion in the said elongated body resulting in the said wide elongated viewing slot in the said sunshade.

* * * * *